United States Patent
Wang et al.

(10) Patent No.: US 9,159,350 B1
(45) Date of Patent: Oct. 13, 2015

(54) HIGH DAMPING CAP LAYER FOR MAGNETIC RECORDING MEDIA

(71) Applicant: WD Media, LLC, San Jose, CA (US)

(72) Inventors: Bincheng Wang, Sunnyvale, CA (US); Antony Ajan, San Jose, CA (US); Michael L. Mallary, Sterling, MA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/322,000

(22) Filed: Jul. 2, 2014

(51) Int. Cl.
  *G11B 5/84* (2006.01)
  *G11B 5/62* (2006.01)
  *G11B 5/00* (2006.01)

(52) U.S. Cl.
  CPC ... *G11B 5/62* (2013.01); *G11B 5/84* (2013.01); *G11B 2005/0021* (2013.01)

(58) Field of Classification Search
  CPC ............. G11B 5/84; G11B 5/83; G11B 5/66
  USPC ...................................................... 360/135
  See application file for complete search history.

(56) References Cited

U.S. PATENT DOCUMENTS

| | | | |
|---|---|---|---|
| 4,525,412 A * | 6/1985 | Nakane et al. | 428/199 |
| 4,536,444 A * | 8/1985 | Sumiya et al. | 428/835.8 |
| 5,134,288 A * | 7/1992 | Van Dijck | 250/307 |
| 5,777,973 A * | 7/1998 | Yoo et al. | 369/112.06 |
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |

(Continued)

FOREIGN PATENT DOCUMENTS

| | | | |
|---|---|---|---|
| CN | 101882445 A | 11/2010 | |
| JP | 08263886 A * | 10/1996 | G11B 11/10 |

(Continued)

OTHER PUBLICATIONS

William Bailey, et al., "Control of Magnetization Dynamics in Ni81Fe19 Thin Films Through the Use of Rare-Earth Dopants," IEEE Transactions on Magnetics, vol. 37, No. 4, Jul. 2001, pp. 1749-1754.

(Continued)

*Primary Examiner* — Allen T Cao (57) ABSTRACT

A recording medium having improved signal-to-noise ratio (SNR) capabilities includes a cap layer over the recording layer, where the cap layer has a magnetic damping constant greater than 0.03, such as by using a FeHo cap layer. One mechanism for increasing the SNR is by reducing the switching field distribution. Such a medium is particularly useful in the context of heat-assisted magnetic recording (HAMR).

21 Claims, 3 Drawing Sheets

(56) References Cited

U.S. PATENT DOCUMENTS

| | | |
|---|---|---|
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,773,826 B2 | 8/2004 | Nakagawa et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,052,757 B2 | 5/2006 | Chaiken et al. |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,313,015 B2 * | 12/2007 | Bessho .......................... 365/158 |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,964,297 B2 | 6/2011 | Deng et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,607 B2 | 8/2011 | Ikeda |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,067,104 B2 | 11/2011 | Tanaka et al. |
| 8,076,013 B2 | 12/2011 | Sonobe et al. |
| 8,089,723 B2 | 1/2012 | Schabes |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,154,915 B2 | 4/2012 | Yoshikawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,202,636 B2 | 6/2012 | Choe et al. |

(56) References Cited

U.S. PATENT DOCUMENTS

| | | |
|---|---|---|
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,345,380 B2 | 1/2013 | Sato et al. |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,576,519 B1 | 11/2013 | Carey et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2001/0028625 A1* | 10/2001 | Asada et al. ............ 369/112.24 |
| 2002/0060883 A1 | 5/2002 | Suzuki |
| 2002/0071377 A1* | 6/2002 | Ogata ...................... 369/112.24 |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2006/0286413 A1 | 12/2006 | Liu et al. |
| 2007/0070549 A1 | 3/2007 | Suzuki et al. |
| 2007/0087227 A1 | 4/2007 | Ma et al. |
| 2007/0171575 A1* | 7/2007 | Lim et al. .................. 360/133 |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0138662 A1 | 6/2008 | Berger et al. |
| 2009/0067092 A1 | 3/2009 | Suwa et al. |
| 2009/0068500 A1 | 3/2009 | Kong et al. |
| 2009/0117408 A1 | 5/2009 | Umezawa et al. |
| 2009/0136784 A1 | 5/2009 | Suzuki et al. |
| 2009/0155627 A1 | 6/2009 | Berger et al. |
| 2009/0169922 A1 | 7/2009 | Ishiyama |
| 2009/0191331 A1 | 7/2009 | Umezawa et al. |
| 2009/0197119 A1 | 8/2009 | Kong et al. |
| 2009/0202866 A1 | 8/2009 | Kim et al. |
| 2009/0273861 A1 | 11/2009 | Tanaka et al. |
| 2009/0311557 A1 | 12/2009 | Onoue et al. |
| 2010/0020324 A1* | 1/2010 | Uchida ......................... 356/369 |
| 2010/0065935 A1* | 3/2010 | Horng et al. ................. 257/421 |
| 2010/0073813 A1 | 3/2010 | Dai et al. |
| 2010/0092802 A1 | 4/2010 | Ma et al. |
| 2010/0098873 A1 | 4/2010 | Verhaverbeke et al. |
| 2010/0119877 A1 | 5/2010 | Wu et al. |
| 2010/0119878 A1 | 5/2010 | Umezawa et al. |
| 2010/0124672 A1 | 5/2010 | Thangaraj et al. |
| 2010/0143752 A1 | 6/2010 | Ishibashi et al. |
| 2010/0159283 A1 | 6/2010 | Ibusuki et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0209737 A1 | 8/2010 | Bian et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0261040 A1 | 10/2010 | Foad et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0111159 A1 | 5/2011 | Sinclair et al. |
| 2011/0143169 A1 | 6/2011 | Albrecht et al. |
| 2011/0151278 A1 | 6/2011 | Gurney et al. |
| 2011/0171495 A1 | 7/2011 | Tachibana et al. |
| 2011/0194207 A1 | 8/2011 | Sato et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |

(56) References Cited

U.S. PATENT DOCUMENTS

| | | | |
|---|---|---|---|
| 2011/0299194 | A1 | 12/2011 | Aniya et al. |
| 2011/0311841 | A1 | 12/2011 | Saito et al. |
| 2012/0069466 | A1 | 3/2012 | Okamoto et al. |
| 2012/0070692 | A1 | 3/2012 | Sato et al. |
| 2012/0077060 | A1 | 3/2012 | Ozawa |
| 2012/0127599 | A1 | 5/2012 | Shimokawa et al. |
| 2012/0127601 | A1 | 5/2012 | Suzuki et al. |
| 2012/0129009 | A1 | 5/2012 | Sato et al. |
| 2012/0140359 | A1 | 6/2012 | Tachibana |
| 2012/0141833 | A1 | 6/2012 | Umezawa et al. |
| 2012/0141835 | A1 | 6/2012 | Sakamoto |
| 2012/0148875 | A1 | 6/2012 | Hamakubo et al. |
| 2012/0156523 | A1 | 6/2012 | Seki et al. |
| 2012/0164488 | A1 | 6/2012 | Shin et al. |
| 2012/0170152 | A1 | 7/2012 | Sonobe et al. |
| 2012/0171369 | A1 | 7/2012 | Koike et al. |
| 2012/0175243 | A1 | 7/2012 | Fukuura et al. |
| 2012/0189872 | A1 | 7/2012 | Umezawa et al. |
| 2012/0196049 | A1 | 8/2012 | Azuma et al. |
| 2012/0207919 | A1 | 8/2012 | Sakamoto et al. |
| 2012/0225217 | A1 | 9/2012 | Itoh et al. |
| 2012/0225325 | A1 | 9/2012 | Nemoto et al. |
| 2012/0251842 | A1 | 10/2012 | Yuan et al. |
| 2012/0251846 | A1 | 10/2012 | Desai et al. |
| 2012/0276417 | A1 | 11/2012 | Shimokawa et al. |
| 2012/0308722 | A1 | 12/2012 | Suzuki et al. |
| 2013/0016591 | A1* | 1/2013 | Tomikawa et al. ......... 369/13.02 |
| 2013/0029182 | A1 | 1/2013 | Zhang et al. |
| 2013/0040167 | A1 | 2/2013 | Alagarsamy et al. |
| 2013/0063841 | A1 | 3/2013 | Braganca et al. |
| 2013/0071694 | A1 | 3/2013 | Srinivasan et al. |
| 2013/0128378 | A1 | 5/2013 | Yuan et al. |
| 2013/0155543 | A1 | 6/2013 | Honda et al. |
| 2013/0165029 | A1 | 6/2013 | Sun et al. |
| 2013/0175252 | A1 | 7/2013 | Bourez |
| 2013/0194901 | A1 | 8/2013 | Kanbe et al. |
| 2013/0216865 | A1 | 8/2013 | Yasumori et al. |
| 2013/0230647 | A1 | 9/2013 | Onoue et al. |
| 2013/0314815 | A1 | 11/2013 | Yuan et al. |
| 2013/0320254 | A1 | 12/2013 | Bhatia et al. |
| 2014/0011054 | A1 | 1/2014 | Suzuki |
| 2014/0044992 | A1 | 2/2014 | Onoue |
| 2014/0050843 | A1 | 2/2014 | Yi et al. |
| 2014/0085753 | A1* | 3/2014 | Nagasaka et al. .......... 360/234.3 |
| 2014/0151360 | A1 | 6/2014 | Gregory et al. |
| 2014/0175581 | A1* | 6/2014 | Guo .............................. 257/421 |
| 2014/0234666 | A1 | 8/2014 | Knigge et al. |
| 2015/0091110 | A1* | 4/2015 | Kuo et al. ..................... 257/421 |

FOREIGN PATENT DOCUMENTS

| | | |
|---|---|---|
| JP | 2003085702 | 3/2003 |
| WO | 2008030199 A1 | 3/2008 |

OTHER PUBLICATIONS

R. Brenier, et al., "Chemical effects in ion beam mixing of Fe—Al multilayers," Journal de Physique IV, vol. 4, Feb. 1994, pp. C3-263-C3-271.

Alessandro Cuccoli, et al., "Anisotropy and Ising-type transition of the S=5/2 two-dimensional antiferromagnet Mn-formate di-Urea," Journal of Applied Physics, vol. 93, No. 10, May 15, 2003, pp. 7637-7639.

Alan M. Ferrenberg, et al., "Monte Carlo study of phase transitions in ferromagnetic bilayers," Journal of Applied Physics, vol. 70, No. 10, Nov. 15, 1991, pp. 6215-6217.

J. Ghatak, et al., "Ion beam induced enhanced diffusion from gold thin films in silicon," Institute of Physics, Bhubaneswar, India, Materials Science Division, Indira Gandhi Center for Atomic Research, Kalpakkam, India, pp. 1-15.

J.F. Hu, et al., "Exchange coupling assisted FePtC perpendicular recording media," Applied Physics Letters, vol. 93, 2008, pp. 072504-1-072504-3.

Y. Inaba, et al., "Preliminary Study on (CoPtCr/NiFe)-SiO2 Hard/Soft-Stacked Perpendicular Recording Media," IEEE Transactions on Magnetics, vol. 41, No. 10, Oct. 2005, pp. 3136-3138.

H.S. Jung, et al., "Comparison of media properties between hard/soft stacked composite and capping layer perpendicular recording media," Journal of Magnetism and Magnetic Materials, vol. 320, 2008, pp. 3151-3156.

H.S. Jung, et al., "Effect of magnetic softness in a soft layer on media properties of hard/soft stacked composite perpendicular media," Journal of Applied Physics, vol. 105, 2009, pp. 07B740-1-07B740-3.

Pavol Krivosik, et al., "Ferromagnetic resonance and damping in granular Co—Cr films with perpendicular anistropy," Applied Physics Letters, vol. 95, 2009, pp. 052509-1-052509-3.

Michael Nastasi, "Ion Beam Mixing," Materials Sci. Tech. Div., Los Alamos National Laboratory, New Mexico, presented in Sicily, Italy, Jul. 2004, pp. 1-42.

Nedo and Hitachi Presentation, create prior to Jul. 1, 2013, pp. 1-3.

Nedo, Hitachi and Hitachi GST, "Microwave-Assisted Magnetic Recording for Net Gen HDD," StorageNewsletter.com, Nov. 2010, pp. 1-3.

K. Norlund, et al., "Mechanisms of ion beam mixing in metals and semiconductors," Journal of Applied Physics, vol. 83, No. 3, 1998, pp. 1238-1246.

J. Sasaki, et al., "Magnetic properties of mesoscopic ultrathin magnetic films with uniaxial anistropy," Journal of Applied Physics, vol. 87, No. 6, Mar. 2000, pp. 3018-3022.

J.-U. Thiele, et al., "Temperature dependent magnetic properties of highly chemically ordered Fe55-xNixPt45L10 films," Journal of Applied Physics, vol. 91, No. 10, May 2002, pp. 6595-6600.

R. H. Victora, et al., "Temporal Fluctuations of Magnetic Anistropy and their Impact on HAMR Media Noise," The Center for Micromagnetics and Information Technologies, Aug. 18, 2010, pp. 1-19.

Zhou, et al., "Anistropy graded FePt—TiO2 nanocomposite thin films with small grain size," Applied Physics Letters, vol. 94, 2009, pp. 152505-1-152505-3.

Zhu, et al., "Microwave Assisted Magnetic Recording," IEEE Transactions on Magnetics, vol. 44, No. 1, Jan. 2008, pp. 125-131.

J.-U. Thiele, et al., "Perpendicular magnetic anistropy and magnetic domain structure in sputtered epitaxial FePt (001) L10 films," Journal of Applied Physics, vol. 84, No. 10, Nov. 1998, pp. 5686-5692.

Dieter Weller, et al., "High Ku Materials Approach to 100 Gbits/in2," IEEE Transactions on Magnetics, vol. 36, No. 1, Jan. 2000, pp. 10-15.

Dieter Weller, et al., "Thermal Effect Limits in Ultrahigh-Density Magnetic Recording," IEEE Transactions on Magnetics, vol. 35, No. 6, Nov. 1999, pp. 4423-4439.

Hiroaki Nemoto, et al., "Highly Hk-graded perpendicular media with [CoB/Pt]n+O multilayer film," Journal of Applied Physics, vol. 109, 2011, pp. 07B719-1-07B719-3.

Hiroaki Nemoto, et al., "Ultrahigh-Hc granular media with [CoB/Pt]n multilayer film sputtered under Ar+O2 atmosphere," Journal of Applied Physics, vol. 105, 2009, pp. 07B705-1-07B705-3.

Gerardo A. Bertero, et al., U.S. Appl. No. 13/773,466, filed Feb. 21, 2013, 20 pages.

Michael L. Mallary, et al., U.S. Appl. No. 13/740,115, filed Jan. 11, 2013, 21 pages.

Bincheng Wang, et al., U.S. Appl. No. 13/932,370, filed Jul. 1, 2013, 19 pages.

Debashish Tripathy, et al. U.S. Appl. No. 14/315,101, filed Jun. 25, 2014, 33 pages.

* cited by examiner

HIGH DAMPING CAP LAYER FOR MAGNETIC RECORDING MEDIA

FIELD OF EMBODIMENTS

Embodiments of the invention may relate generally to hard disk drives and more particularly to magnetic recording media.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) is a technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature near the Curie temperature, at which the medium effectively loses coercivity and a realistically achievable magnetic write field can write data to the medium.

In order to improve the recording performance for media, including HAMR media, it is desirable to increase the SNR (Signal-to-Noise Ratio) through structure design and materials selections.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a recording medium having a cap layer composed of a high magnetic damping material over the magnetic recording layer are described. In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Physical Description of Illustrative Operating Environments

Embodiments may be used in the context of a heat-assisted magnetic recording (HAMR) medium in a hard-disk drive (HDD) data storage device. Thus, in accordance with an embodiment, a plan view illustrating an HDD 100 is shown in FIG. 1 to illustrate an exemplary operating environment.

Figure 1:
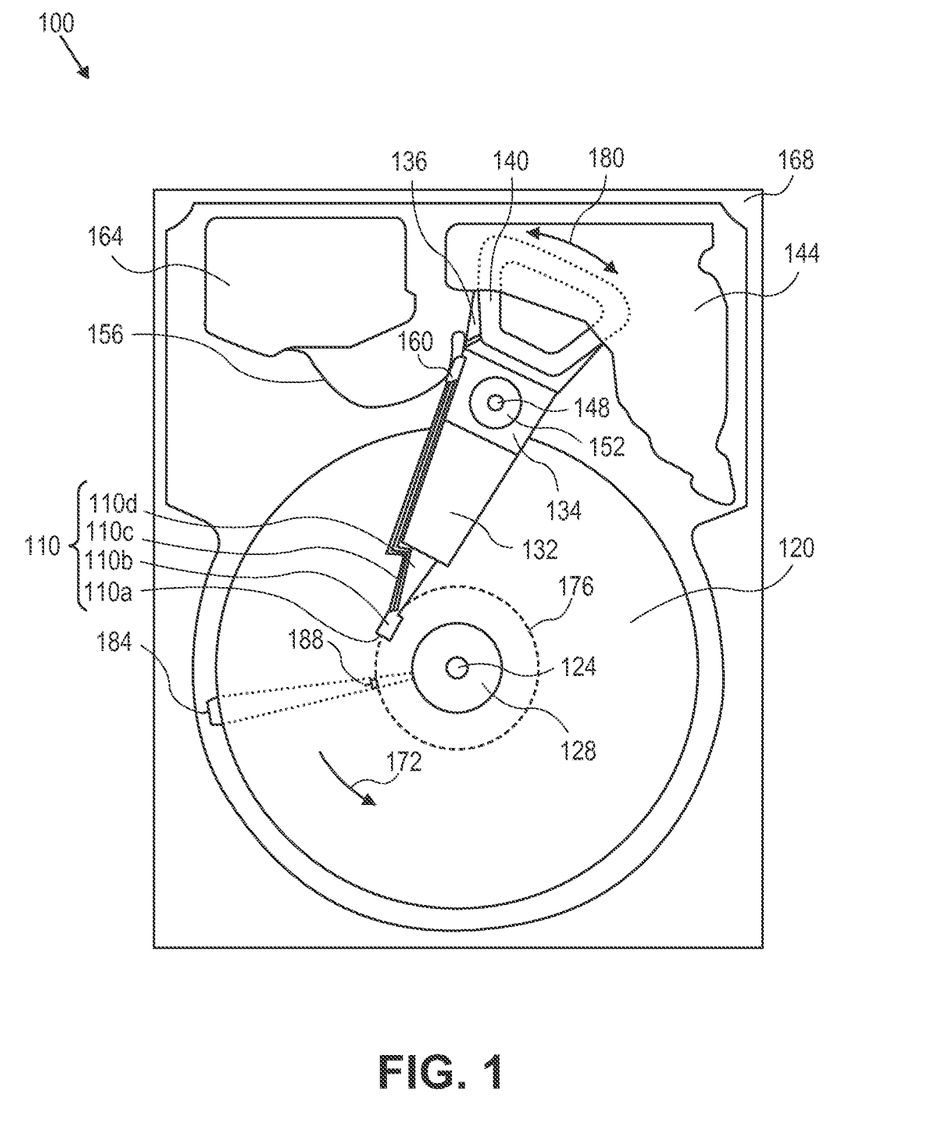
FIG. 1 is a plan view illustrating a hard disk drive, according to an embodiment.

FIG. 1 illustrates the functional arrangement of components of the HDD 100 including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one magnetic-recording medium 120 rotatably mounted on a spindle 124 and a drive motor (not visible) attached to the spindle 124 for rotating the medium 120. The head 110*a* includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

INTRODUCTION

Heat-assisted magnetic recording (HAMR) technology that utilizes $L1_0$ FePt based alloys has been widely investigated for use in hard disk drive media, with a belief that an areal density over 10 Tb/in$^2$ may be achievable. As mentioned, increasing the SNR of media, including HAMR media, improves the recording performance. One approach to a media structure for HAMR applications consists of adhesion, intermediate, magnetic, overcoat and lubricant layers, all stacked on a substrate. To improve the recording performance of HAMR media, particularly media SNR and SNRdc, media structure design and material selection is an area of interest. For example, areas of research have involved media structure design and material selection relating to the magnetic layer, the intermediate layer (e.g., the seed layer, underlayer, heat sink), etc.

One approach to increasing SNR is to reduce the switching field distribution (SFD) of the magnetic layer. Data storage devices often utilize ferromagnetic materials which, when subjected to an externally applied magnetic field, may switch their magnetization (or "magnetic polarization") between two stable orientations. A magnetic moment represents the torque that a ferromagnetic material experiences under the influence of an external magnetic field, and is commonly characterized as a vector, thus having a magnitude and a direction. Typically, when an applied magnetic field is switched from a first value to a second value, the magnetization of the ferromagnetic material may not immediately switch value commensurately, or may not completely switch valises in line with the direction of the applied magnetic field. That is, the magnetization of the ferromagnetic material may react in a manner which causes the magnetic moment to precess around the direction of the applied magnetic field until settling at a steady state value in the direction of the applied magnetic field. This magnetic precession is sometimes referred to as Larmor precession. Generally, the extent to which the magnetization of the ferromagnetic material switches under the influence of applied magnetic fields can be characterized as its SFD.

High Magnetic Damping Cap Layer for Recording Media

Figure 2:
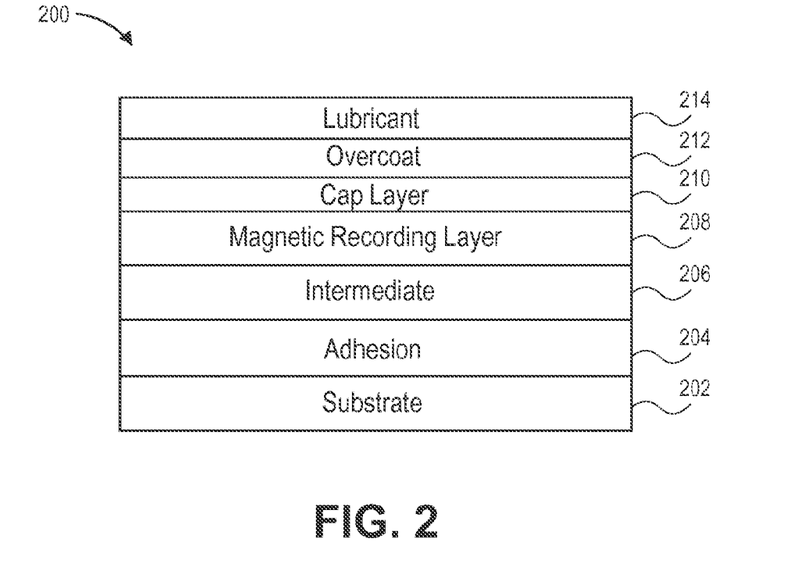
FIG. 2 illustrates a magnetic recording medium stack having a cap layer, according to an embodiment.

FIG. 2 illustrates a magnetic recording medium stack having a cap layer, according to an embodiment. The medium 200 includes a stacked structure with a bottom substrate 202, an adhesion layer 204 over or on the substrate 202, an intermediate layer 206 over or on the adhesion layer 204, a magnetic recording layer 208 over or on the intermediate layer 206, a cap layer 210 over or on the magnetic recording layer 208, an overcoat layer 212 over or on the cap layer 210, and a lubricant layer 214 on the overcoat layer 212.

According to an embodiment, the magnetic recording layer 208 may comprise a FePt based material. For example, the magnetic recording layer 208 may include FePt or any suitable FePt alloys (e.g., $L1_0$ FePt).

There may be multiple approaches to describing the aforementioned magnetic precession motion that may occur in materials such as ferromagnetic metals. One known approach for describing such magnetic precession, i.e., for predicting the rotation of the magnetization in response to torques, is referred to as the Landau-Lifshitz-Gilbert ("LLG") equation. The LLG equation includes a damping term, parameter, or coefficient (also referred to herein as a "damping constant"), which is a characteristic of the material. Thus, the amount of tune needed for the magnetization within a material to reach a steady state after the magnetic field applied to the material has been switched may be described by and referred to as the Gilbert magnetic damping constant for the material. If the magnetic damping of a material is high, then the magnetization of the material may reach a steady state value more quickly after the applied magnetic field has switched, as compared to materials with a lower magnetic damping. Consequently, a sharper transition of the magnetization of the ferromagnetic material to the steady state value is possible with relatively high magnetic damping materials, in conjunction with an appropriately featured write head.

Furthermore, a technique that may be used for measuring a material's magnetic damping characteristics is referred to as ferromagnetic resonance, which is a spectroscopic technique used for probing the magnetization of ferromagnetic materials and for studying spin dynamics. Thus, ferromagnetic resonance is a useful tool in studying the precessional motion of a ferromagnetic material under the influence of an external magnetic field and, likewise, the material's inherent magnetic damping attributes. According to an embodiment, a ferromagnetic resonance technique is employed to measure the damping constant of cap layer 210.

One approach to characterizing the magnetic damping corresponding to a recording medium includes assessing and characterizing an average damping of the magnetic recording layer 208 and the cap layer 210, based at least on the relative damping constants of each layer and their respective thicknesses. Therefore, generally, the greater the magnetic damping constant of the cap layer 210 the greater the damping attributable to the medium. Because the thickness and composition of the magnetic recording layer 208 and cap layer 210 may vary from implementation to implementation, likewise, the damping constant of the cap layer 210 may vary from implementation to implementation.

According to an embodiment, the cap layer 210 comprises a material having a higher magnetic damping than Fe. The comparison with Fe corresponds generally with the use of Fe in the magnetic recording layer 208 and/or the use of Fe in the cap layer 210 along with one or more other element having a higher magnetic damping than Fe. The magnetic damping constant of pure Fe, Co and Ni are reported to be in the approximately 0.003-0.005 range.

However, according to an embodiment, the cap layer 210 comprises a material having a magnetic damping constant greater than about 0.03, which is considered a value at which a desirable effect on the medium damping is expected. According to another embodiment, the cap layer 210 comprises a material having a magnetic damping constant greater than about 0.2, which is considered a value at which an approximate 5% damping of the medium may be expected (i.e., a 0.05 media damping coefficient). Therefore, according to an embodiment, the cap layer 210 comprises a material having a magnetic damping constant in a preferable range of about 0.03-0.2. However, an extended range from about 0.003 to exceed Fe, Co, Ni, to a value that would achieve 20% media damping, is contemplated.

According to an embodiment, cap layer 210 comprises a lanthanide (or lanthanoid) element, where the lanthanide series of chemical elements includes the fifteen metallic elements with atomic numbers 57-71 (lanthanum to lutetium), i.e., part of the rare earth elements. The lanthanides include neodymium (Nd), holmium (Ho), and erbium (Er), to name just a few. Reference to use of a lanthanide element constituent to cap layer 210 may include the use of a lanthanide alloy, which could include an alloy composed of multiple lanthanides or an alloy composed of a lanthanide and one or more non-lanthanide metal. Use of a lanthanide in cap layer 210 is based on the corresponding and relatively high magnetic damping characteristics.

According to an embodiment, cap layer 210 comprises FeHo. The introduction of a high damping FeHo based alloy cap layer 210 is capable of increasing SNR, SNRfinal and SNRdc compared to current FePt based HAMR media without a cap layer. In addition, jitter and magnetic switching field are also reduced with the presence of the FeHo cap layer. For non-limiting examples, research has shown results increasing the SNR, SNRfinal and SNRdc by 0.7 dB, 1.8 dB and 1.0 dB, respectively; a reduction in jitter associated with the magnetic recording layer by 0.8 nm; and a reduction in switching field distribution (SFD) of the magnetic recording layer by 9.5%.

Because of the general relationship that the greater the magnetic damping constant of the cap layer 210 the greater the damping attributable to the medium, an ever higher and higher damping cap layer 210 is desirable, but could be constrained by manufacturing capabilities. Thus, according to an embodiment the cap layer 210 includes Ho up to about 20 atomic percent or less. According to an embodiment, the cap layer 210 has a thickness of less than about 5 nm. The cap layer 210 may have a thickness in a preferred but non-limiting range of about 0.5 nm to 2.5 nm. Further, and according to an embodiment, the cap layer 210 comprises a semi-crystalline structure. However, crystalline and/or amorphous structures are not excluded from use. Further still, and according to an embodiment, the cap layer 210 is fabricated to be directly on and in contact with the magnetic recording layer 208. Further still, and according to an embodiment, the cap layer 210 is fabricated to be exchange coupled with the magnetic recording layer 208.

As discussed, the addition of the cap layer 210 can enable an increase in the SNR of the magnetic recording layer 208 by reducing the SFD of the medium. The medium 200 described in reference to FIG. 2 is well-suited for use in hard disk drive heat-assisted magnetic recording (HAMR) systems, wherein individual magnetic recording bit size and overall areal density are significant design goals. However, other types of energy-assisted media and "traditional" media (e.g., perpendicular magnetic recording, or PMR) based systems may also benefit from the use of a high damping cap layer in the respective media types.

To further improve the recording performance of the medium 200, especially media SNR, various suitable media designs and material selections may be used. According to an embodiment, the substrate 202 may include a material selected from the group consisting of an Al alloy, NiP plated Al, glass, glass ceramic, and combinations thereof. Further, and according to an embodiment, the adhesion layer 204 may include a material selected from the group consisting of CrTi, CrTa, NiTa, CoCrTaZr, CoFeZrBCr, CoTaZr, CoFeTaZr, CoCrWTaZr, CoCrMoTaZr, CoZrWMo and combinations thereof. Further still, and according to an embodiment, the intermediate layer 206 may include Cr, Mo, Ru, W, CuZr, MoCu, AgPd, CrRu, CrV, CrW, CrMo, CrNd, NiAl, NiTa, CrTiX, CrTaX, NiTaX, CoCrTaZrX, CoFeZrBCrX, CoTaZrX, CoFeTaZrX, CoCrWTaZrX, CoCrMoTaZrX, CoZrWMoX, and combinations thereof, wherein X is selected from the group consisting of $SiO_2$ and $ZrO_2$. According to an embodiment, the overcoat layer 212 may include diamond-like-carbon (DLC). According to an embodiment, the lubricant layer 214 may include a polymer-based material.

Figure 3:
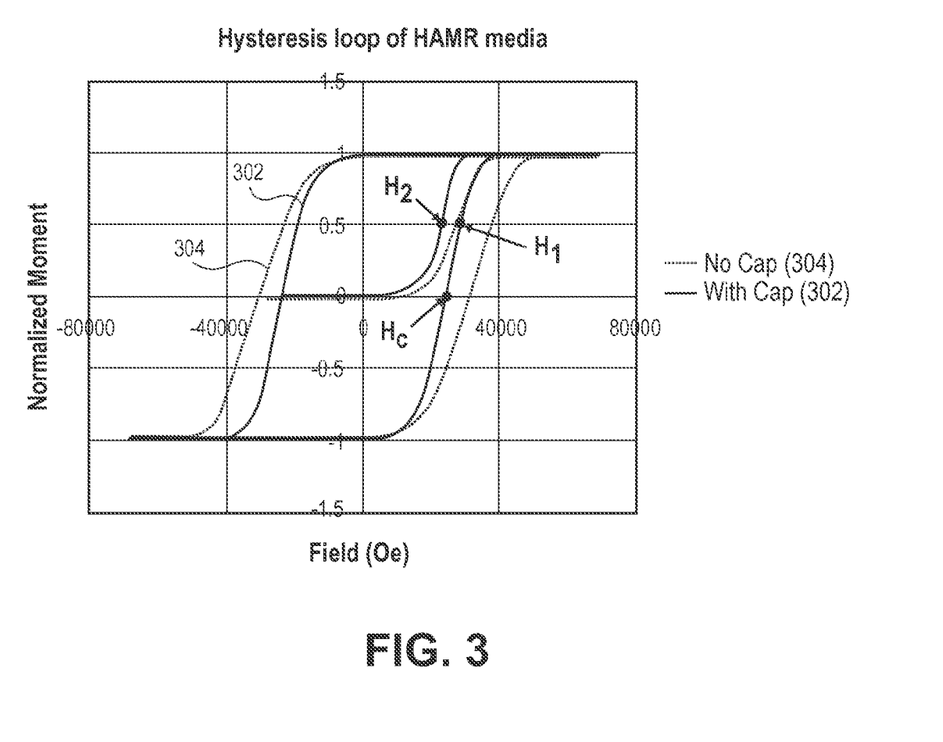
FIG. 3 is a graph showing hysteresis loops of HAMR media with and without a cap layer, according to an embodiment.

FIG. 3 is a graph showing hysteresis loops of HAMR media (e.g., HAMR medium 200) with and without a cap layer, according to an embodiment. The loops 302 correspond to a HAMR medium with a FeHo cap layer and the loops 304 correspond to a reference HAMR medium without a cap layer. As shown in FIG. 3, the HAMR medium with the cap layer (302) has an SFD of about 15.6 percent, and the reference HAMR medium (304) has an SFD of about 25.1 percent, which equates to a significant reduction of about 9.5 percent in SFD. From the hysteresis loops of FIG. 3, the SFD of the HAMR media can be calculated, for example, based on a relationship between (a) the difference of the field $H_1$ (at moment=0.5) and the field $H_2$ (at moment=0.5), and (b) the field $H_c$ (at moment=0).

Embodiments described herein may be directed to a HAMR media design utilizing a cap layer for improved SNR. In various embodiments, the introduction of a suitable cap layer results in a desirable decrease in the magnetic switching field and a corresponding increase in the SNR for the HAMR media. However, embodiments are not limited to HAMR technology only, as embodiments may be implemented in the context of other types of magnetic recording media.

Method of Manufacturing Recording Media

Figure 4:
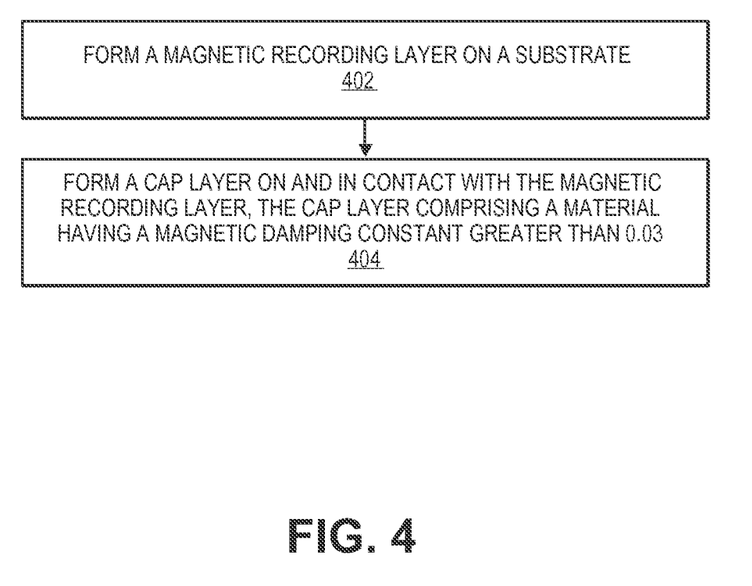
FIG. 4 is a flow diagram illustrating a method of manufacturing a recording medium, according to an embodiment.

Embodiments may be implemented in a HAMR hard disk drive including such HAMR media. FIG. 4 is a flow diagram illustrating a method of manufacturing a recording medium, according to an embodiment. The media stack described herein can be fabricated, for example, by a sputtering process using a sputtering system.

At block 402, a magnetic recording layer is formed on a substrate. For example, magnetic recording layer 208 (FIG. 2) is formed on substrate 202 (FIG. 2). As noted in reference to FIG. 2, an adhesion layer 204 and an intermediate layer 206 may also be fabricated on substrate 202 before forming the magnetic recording layer 208.

At block 404, a cap layer is formed on and exchange coupled with the magnetic recording layer, where the cap layer comprises a material having a magnetic damping constant greater than 0.03. For example, cap layer 210 (FIG. 2) is formed (e.g., sputtered) directly on top of the magnetic recording layer 208. As with aforementioned embodiments, the cap layer formed at block 404 may have a magnetic damping higher than Fe; such a cap layer may comprise a lanthanide; and such a cap layer may comprise FeHo, for example, having a thickness less than about 5 nm, having Ho at about 20 atomic percent or less, and having a semi-crystalline structure.

The deposition of layers can be performed using a variety of deposition sub-processes, for non-limiting examples, physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). Furthermore, other suitable deposition techniques known in the art may also be used.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A recording medium comprising:
   a substrate;
   an adhesion layer over said substrate;
   an intermediate layer over said adhesion layer;
   a magnetic recording layer over said substrate, said adhesion layer and said intermediate layer;
   a cap layer on said magnetic recording layer, said cap layer comprising a material having a magnetic damping constant greater than 0.03;
   an overcoat layer over said cap layer; and
   a lubricant layer over said overcoat layer.

2. The recording medium of claim 1, wherein said cap layer comprises a material having a magnetic damping constant of about 0.2.

3. The recording medium of claim 1, wherein said cap layer comprises a material having higher magnetic damping than Fe.

4. The recording medium of claim 1, wherein said cap layer comprises a lanthanide element.

5. The recording medium of claim 1, wherein said cap layer comprises FeHo.

6. The recording medium of claim 1, wherein said cap layer is a semi-crystalline structure.

7. The recording medium of claim 1, wherein said cap layer comprises Ho at approximately 20 atomic percent or less.

8. The recording medium of claim 1, wherein said cap layer has a thickness less than approximately 5 nm.

9. The recording medium of claim 1, wherein said cap layer is exchange coupled with said magnetic recording layer comprising FePt.

10. The recording medium of claim 1, wherein said cap layer and said magnetic recording layer are configured to reduce the switching field distribution of said magnetic recording layer.

11. The recording medium of claim 1, wherein said magnetic damping constant is determined using a ferromagnetic resonance technique.

12. A data storage device comprising:
    a heat-assisted magnetic recording (HAMR) disk medium rotatably mounted on a spindle, said HAMR disk medium comprising:
      a substrate;
      an adhesion layer over said substrate;
      an intermediate layer over said adhesion layer;
      a magnetic recording layer over said substrate, said adhesion layer and said intermediate layer;
      a cap layer on said magnetic recording layer, said cap layer comprising a material having a magnetic damping constant greater than 0.003;
      an overcoat layer over said cap layer; and a lubricant layer over said overcoat layer;
a heat-assisted magnetic recording (HAMR) head slider comprising a magnetic write head configured to write to said HAMR disk medium;
a laser module coupled with said slider; and
a voice coil motor configured to move said HAMR head slider to access portions of said HAMR disk medium.

13. The data storage device claim 12, wherein said cap layer of said HAMR disk medium comprises a material having a magnetic damping constant of about 0.2.

14. The data storage device claim 12, wherein said cap layer of said HAMR disk medium comprises a lanthanide.

15. The data storage device of claim 12, wherein said cap layer of said HAMR disk medium comprises FeHo.

16. The data storage device of claim 12, wherein said magnetic damping constant is determined using a ferromagnetic resonance technique.

17. A method of manufacturing a recording medium, the method comprising:
    forming a magnetic recording layer on a substrate; and
    forming a cap layer on and exchange coupled with said magnetic recording layer, said cap layer comprising a material having a magnetic damping constant greater than 0.03;
    wherein said cap layer and said magnetic recording layer are formed to reduce the switching field distribution of said magnetic recording layer.

18. The method of claim 17, wherein forming said cap layer comprises forming a cap layer comprising FeHo.

19. The method of claim 17, wherein forming said magnetic recording layer comprises forming a magnetic recording layer of FePt, and wherein forming said cap layer comprises forming a cap layer comprising a material having a magnetic damping constant greater than 0.003.

20. A recording medium comprising:
    a substrate;
    a magnetic recording layer over said substrate; and
    a cap layer on said magnetic recording layer, said cap layer comprising a material having a magnetic damping constant greater than 0.03;
    wherein said cap layer and said magnetic recording layer are configured to reduce the switching field distribution of said magnetic recording layer.

21. A data storage device comprising:
    a heat-assisted magnetic recording (HAMR) disk medium rotatably mounted on a spindle, said HAMR disk medium comprising:
        a substrate;
        a magnetic recording layer on said substrate; and
        a cap layer on said magnetic recording layer, said cap layer comprising a material having a magnetic damping constant greater than 0.003;
        wherein said cap layer and said magnetic recording layer are configured to reduce the switching field distribution of said magnetic recording layer;
    a heat-assisted magnetic recording (HAMR) head slider comprising a magnetic write head configured to write to said HAMR disk medium;
    a laser module coupled with said slider; and
    a voice coil motor configured to move said HAMR head slider to access portions of said HAMR disk medium.

* * * * *